United States Patent
Oshima et al.

(10) Patent No.: US 9,876,232 B2
(45) Date of Patent: Jan. 23, 2018

(54) POSITIVE ELECTRODE FOR SECONDARY BATTERY, METHOD FOR PRODUCING THE SAME, AND NONAQUEOUS SECONDARY BATTERY

(71) Applicant: KABUSHIKI KAISHA TOYOTA JIDOSHOKKI, Kariya-shi, Aichi (JP)

(72) Inventors: Hiroki Oshima, Kariya (JP); Takeshi Maki, Kariya (JP)

(73) Assignee: KABUSHIKI KAISHA TOYOTA JIDOSHOKKI, Kariya-shi, Tokyo (JP)

( * ) Notice: Subject to any disclaimer, the term of this patent is extended or adjusted under 35 U.S.C. 154(b) by 447 days.

(21) Appl. No.: 14/396,835

(22) PCT Filed: Apr. 25, 2013

(86) PCT No.: PCT/JP2013/002813
§ 371 (c)(1),
(2) Date: Oct. 24, 2014

(87) PCT Pub. No.: WO2013/161309
PCT Pub. Date: Oct. 31, 2013

(65) Prior Publication Data
US 2015/0118551 A1 Apr. 30, 2015

(30) Foreign Application Priority Data

Apr. 27, 2012 (JP) .................. 2012-102359
Oct. 16, 2012 (JP) .................. 2012-228587

(51) Int. Cl.
*H01M 4/62* (2006.01)
*H01M 4/36* (2006.01)
(Continued)

(52) U.S. Cl.
CPC ......... *H01M 4/628* (2013.01); *H01M 4/0404* (2013.01); *H01M 4/13* (2013.01);
(Continued)

(58) Field of Classification Search
CPC .... H01M 4/0404; H01M 4/13–4/1399; H01M 4/62–4/623; H01M 4/628
See application file for complete search history.

(56) References Cited

U.S. PATENT DOCUMENTS

| | | | |
|---|---|---|---|
| 6,355,379 B1 * | 3/2002 | Ohshita | H01M 4/13 429/188 |
| 2004/0018430 A1 * | 1/2004 | Holman | H01G 11/48 429/233 |

(Continued)

FOREIGN PATENT DOCUMENTS

| | | |
|---|---|---|
| JP | 11-097027 A | 4/1999 |
| JP | 11-154514 A | 6/1999 |

(Continued)

OTHER PUBLICATIONS

Machine Translation of Sato et al., JP 2004-171907 (Jun. 17, 2004).*

(Continued)

*Primary Examiner* — Jonathan Crepeau
*Assistant Examiner* — Jacob Buchanan
(74) *Attorney, Agent, or Firm* — Sughrue Mion, PLLC

(57) ABSTRACT

A positive electrode active material layer comprises a coating layer for coating at least part of surfaces of positive electrode active material particles. The coating layer comprises alternate layers of a cationic material layer containing a cationic material having a positive zeta potential and an anionic material layer containing an anionic material having a negative zeta potential under neutral conditions, and a material layer having a zeta potential of opposite sign to that of the positive electrode active material particles is bonded to the surfaces of the positive electrode active material particles. The coating layer is thin and uniform, and has a high strength for bonding to the positive electrode active material particles, so the coating layer suppresses direct contact of the positive electrode active material particles and an electrolytic solution even when a nonaqueous secondary battery is used at a high voltage.

12 Claims, 1 Drawing Sheet

(51) Int. Cl.
*H01M 4/04* (2006.01)
*H01M 4/13* (2010.01)
*H01M 4/139* (2010.01)
*H01M 10/0525* (2010.01)
*H01M 10/42* (2006.01)
*H01M 4/02* (2006.01)
*H01M 4/131* (2010.01)
*H01M 4/1391* (2010.01)

(52) U.S. Cl.
CPC ........... *H01M 4/139* (2013.01); *H01M 4/366* (2013.01); *H01M 4/62* (2013.01); *H01M 4/622* (2013.01); *H01M 10/0525* (2013.01); *H01M 10/4235* (2013.01); *H01M 4/131* (2013.01); *H01M 4/1391* (2013.01); *H01M 2004/028* (2013.01)

(56) References Cited

U.S. PATENT DOCUMENTS

| | | | | |
|---|---|---|---|---|
| 2005/0238957 A1* | 10/2005 | Kim | ............... | H01M 4/0404 429/212 |
| 2005/0266150 A1* | 12/2005 | Yong | ............... | H01M 2/166 427/58 |
| 2007/0048618 A1* | 3/2007 | Okumura | ............ | H01M 2/1673 429/309 |
| 2007/0055023 A1* | 3/2007 | Han | ............... | H01M 4/622 525/329.7 |
| 2011/0287305 A1* | 11/2011 | Scordilis-Kelley | . | H01M 2/1653 429/163 |
| 2011/0311864 A1 | 12/2011 | Yamada et al. | | |
| 2013/0108776 A1* | 5/2013 | Li | ............... | H01M 4/0404 427/8 |

FOREIGN PATENT DOCUMENTS

| | | |
|---|---|---|
| JP | 2004-171907 A | 6/2004 |
| JP | 2006-076865 A | 3/2006 |
| JP | 2007-059264 A | 3/2007 |
| JP | 2007-510267 A | 4/2007 |
| JP | 2012-023034 A | 2/2012 |
| JP | 2012-082307 A | 4/2012 |

OTHER PUBLICATIONS

International Search Report for PCT/JP2013/002813 dated Jun. 18, 2013.

Written Opinion for PCT/JP2013/002813 dated Jun. 18, 2013.

* cited by examiner

POSITIVE ELECTRODE FOR SECONDARY BATTERY, METHOD FOR PRODUCING THE SAME, AND NONAQUEOUS SECONDARY BATTERY

CROSS REFERENCE TO RELATED APPLICATIONS

This application is a National Stage of International Application No. PCT/JP2013/002813 filed Apr. 25, 2013, claiming priority based on Japanese Patent Application No. 2012-102359 filed Apr. 27, 2012 and 2012-228587 filed Oct. 16, 2012, the contents of all of which are incorporated herein by reference in their entirety.

TECHNICAL FIELD

The present invention relates to a positive electrode to be used for a lithium-ion secondary battery and a nonaqueous secondary battery using the positive electrode.

BACKGROUND ART

Lithium-ion secondary batteries are secondary batteries having high charge and discharge capacity and capable of outputting high power. The lithium-ion secondary batteries are now mainly used as power sources for portable electronic devices and are promising power sources for electric vehicles to be widely used in future. A lithium-ion secondary battery has an active material capable of absorbing and releasing lithium (Li) at each of a positive electrode and a negative electrode. The lithium-ion secondary battery works by moving lithium ions in an electrolytic solution provided between these two electrodes. In such a lithium-ion secondary battery, lithium-containing metal composite oxide such as lithium-cobalt composite oxide is mainly used as an active material for a positive electrode, and a carbon material having a multilayer structure is mainly used as an active material for a negative electrode.

The lithium-ion secondary batteries are demanded to have higher capacity and are under study for positive electrode potential to rise a voltage. However, when used at a high voltage, the lithium-ion secondary batteries have a problem that battery characteristics drastically deteriorate after repeated charge and discharge. This is supposed to be caused by oxidation decomposition of electrolytic solutions or electrolytes around positive electrodes when the batteries are charged.

That is to say, a decrease in capacity is considered to be caused by consumption of lithium ions by oxidation decomposition of electrolytes around positive electrodes. Moreover, a decrease in output power is considered to be caused because decomposed materials of electrolytic solutions or electrolytes deposit on pores inside the electrodes and separators and exhibit resistance to lithium-ion conduction. Therefore, in order to solve these problems, decomposition of the electrolytic solutions needs to be suppressed.

Japanese Unexamined Patent Application Publication No. H11-097,027, Japanese Unexamined Patent Application Publication (Translation of PCT International Application) No. 2007-510,267 and the like disclose nonaqueous secondary batteries each having a positive electrode having a coating layer comprising an ion-conductive polymer on a surface thereof. Formation of such a coating layer suppresses degradation, such as elution and decomposition, of a positive electrode active material.

These publications, however, do not describe evaluation of the batteries when charged at a high voltage of 4.3 V or more, and it is unclear whether the batteries withstand use at such a high voltage. The coating layers substantially have thicknesses on a micrometer order and exhibit resistance to lithium-ion conduction. Spray coating and one-time dipping coating are employed for forming these coating layers, but these methods have a difficulty in providing uniform film thickness.

CITATION LIST

Patent Literature

[PTL 1] Japanese Unexamined Patent Application Publication No. H11-097,027

[PTL 2] Japanese Unexamined Patent Application Publication (Translation of PCT International Application) No. 2007-510,267

SUMMARY OF INVENTION

Technical Problem

The present invention has been made in view of the foregoing circumstances. The object of the present invention is to provide a positive electrode for a nonaqueous secondary battery withstanding use at a high voltage.

Solution to Problem

A positive electrode for a secondary battery according to the present invention, which solves the abovementioned problem, comprising a current collector and a positive electrode active material layer bonded to the current collector, characterized in that the positive electrode active material layer comprises positive electrode active material particles, a bonding portion for bonding the positive electrode active particles with each other and bonding the positive electrode active material particles with the current collector, and a coating layer for coating at least part of surfaces of at least the positive electrode active material particles, the coating layer comprises alternate layers of a cationic material layer containing a cationic material having a positive zeta potential under neutral conditions and an anionic material layer containing an anionic material having a negative zeta potential under neutral conditions, and a material layer having a zeta potential of opposite sign to that of the positive electrode active material particles is bonded to surfaces of the positive electrode active material particles.

Advantageous Effects of Invention

In the positive electrode for a secondary battery according to the present invention, a material layer having a zeta potential of opposite sign to that of the positive electrode active material particles is bonded to surfaces of the positive electrode active material particles. For example, when the positive electrode active material particles have a negative zeta potential, first, a cationic material layer is deposited and then an anionic material layer is deposited on a surface of the cationic material layer. Therefore, the positive electrode active materials and the cationic material layer are firmly bonded to each other by Coulomb's force. Besides, the cationic material layer and the anionic material layer are firmly bonded to each other by Coulomb's force. Therefore, each of the cationic material layer and the anionic material layer can be formed thin and a coating layer can have a total thickness on a nanometer order, so a thin uniform coating layer can be formed.

Having a high strength for bonding to the positive electrode active material particles, the coating layer thus formed suppresses direct contact of the positive electrode active material particles and an electrolytic solution even when a secondary battery comprising a positive electrode having the coating layer is used at a high voltage. Moreover, since the coating layer has a total thickness on a nanometer order, the coating layer is suppressed from exhibiting resistance to lithium-ion conduction. Therefore, even when the secondary battery is used at a high voltage, the electrolytic solution is suppressed from being decomposed. Thus, the preset invention provides a nonaqueous secondary battery having a high capacity and keeping high battery characteristics even after repeated charge and discharge.

Moreover, since the coating layer can be formed by dipping, productivity is high.

MODES FOR CARRYING OUT THE INVENTION

Figure 1:
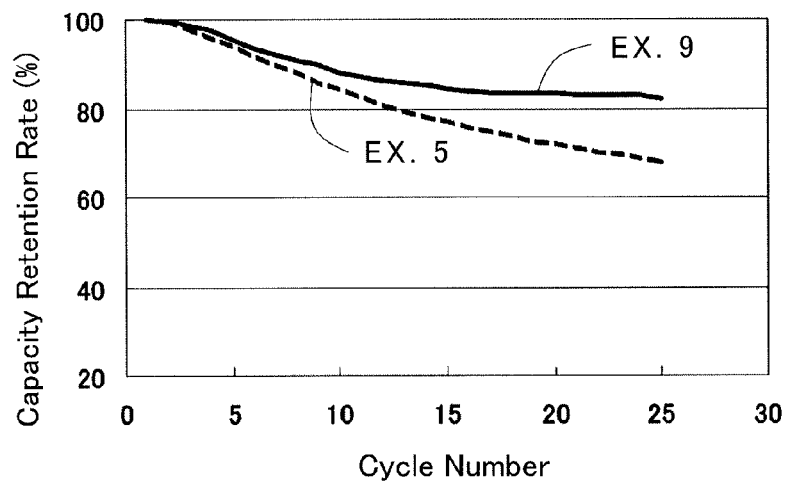
FIG. 1 is a graph showing a relation between capacity retention rate and cycle number of lithium-ion secondary batteries produced in examples of the present invention.

The "zeta potential" mentioned in the present invention is measured by microscopic electrophoresis, rotating diffraction grating, laser Doppler electrophoresis, an ultrasonic vibration potential (UVP) method, or an electrokinetic sonic amplitude (ESA) method. Especially preferably, "zeta potential" is measured by laser Doppler electrophoresis. (Specific measurement conditions will be described below but measurement conditions are not limited to those mentioned below. First, solutions (suspensions) having a solid content concentration of 0.1 wt % were prepared by using DMF, acetone, or water as solvent. Then zeta potential was measured three times at a temperature of 25 deg. C. and an average of the measured values was calculated. With respect to the pH, the solutions were put under neutral conditions. The neutral conditions are, for example, about pH 7.)

The positive electrode for a secondary battery according to the present invention comprises a current collector and a positive electrode active material layer bonded to the current collector. The current collector can be those generally used for positive electrodes for lithium-ion secondary batteries or the like. Examples of the current collector include aluminum foil, aluminum mesh, punching aluminum sheets, aluminum expanded sheets, stainless steel foil, stainless steel mesh, punching stainless steel sheets, stainless steel expanded sheets, foamed nickel, nickel non-woven fabric, copper foil, copper mesh, punching copper sheets, copper expanded sheets, titanium foil, titanium mesh, carbon non-woven fabric, and carbon woven fabric.

The positive electrode active material layer comprises positive electrode active material particles, a bonding portion for bonding the positive electrode active material particles with each other and bonding the positive electrode active material particles with the current collector, and a coating layer for coating at least part of surfaces of at least the positive electrode active material particles.

Examples of the positive electrode active material include Li compounds or solid solutions selected from $Li_xNi_aCo_b$-$Mn_cO_2$, $Li_xCo_bMn_cO_2$, $Li_xNi_aMn_cO_2$, $Li_xNi_aCo_bO_2$ and $Li_2MnO_3$, wherein $0.5 \le x \le 1.5$, $0.1 \le a < 1$, $0.1 \le b < 1$, $0.1 \le c < 1$); materials comprising lithium manganese-based composite oxide (e.g., $Li_2MnO_3$) containing lithium (Li) and tetravalent manganese (Mn), wherein crystal structure thereof belongs to a layered rock-salt structure; Olivine-structure phosphate-based compounds $LiMPO_4$ (e.g., $LiMnPO_4$, $LiFePo_4$, $LiCoPO_4$); $LiCoO_2$; lithium silicate-based compounds; and lithium manganese-based composite oxide expressed by $xLi_2M_1O_3 \cdot (1-x)LiM_2O_2$, wherein $0 \le x \le 1$, $M_1$ is one or more kinds of metal elements having tetravalent Mn as an essential, $M_2$ is two or more kinds of metal elements having tetravalent Mn as an essential, part of each Li can be replaced with hydrogen).

Part of surfaces of these Li compounds or solid solutions can be modified and can be covered with one or more inorganic substances. In these cases, the Li compounds or solid solutions including the modified surfaces or the one or more covering inorganic substances are called positive electrode active material particles.

The coating layer comprises alternate layers of a cationic material layer containing a cationic material having a positive zeta potential and an anionic material layer containing an anionic material having a negative zeta potential. Examples of the cationic material having a positive zeta potential include organic cations having N in molecular structure such as diethylenetriamine, triethylenetetramine and cationic polymers; for example, polyethylene imine, polyallylamine, polyvinylamine, polyaniline, and polydiallyldimethylammonium chloride; and inorganic cations called layered double hydroxides (LDH) such as $Mg_3Al$ $(OH)_8$. A cationic polymer is particularly preferred because film formation is easy.

Desirably, the cationic material has a zeta potential of +20 mV or more. When the zeta potential is less than +20 mV, bonding strength decreases and uniform-film formation is difficult.

Examples of the anionic material include organic anions such as anionic polymers; for example, polyacrylic acid, sodium polyacrylate, polymethacrylic acid, polyvinyl sulfonic acid, polyethylene glycol, polyvinylidene fluoride, polytetrafluoroethylene and polyacrylonitrile; compounds containing carboxyl groups; compounds containing sulfo groups; compounds containing phosphono groups; and compounds containing nitrile groups such as pimelonitrile; and inorganic anions such as $Zn(HPO_4)_2$ and layered titanate compounds.

When polyethylene glycol is used, in view of preventing polyethylene glycol from eluting into an electrolytic solution, preferably the polyethylene glycol has a number average molecular weight of 500 or more, and especially desirably has a number average molecular weight of 20,000. Using polyethylene glycol which has been thermally treated at 60 to 150 deg. C. is also preferable. Use of thermally treated polyethylene glycol further improves battery characteristics. A heat treatment temperature below 60 deg. C. is not preferred because heat treatment takes a long time. On the other hand, a heat treatment temperature above 150 deg. C. is not preferred, either, because decomposition starts. Heat treatment is desirably carried out in a non-oxidizing atmosphere such as in vacuum, but can be carried out in the air.

A nitrile compound having a low molecular weight is also preferably used as an anionic material. Examples of such a nitrile compound having a low molecular weight include pimelonitrile, adiponitrile, glutaronitrile, and succinonitrile. Moreover, a nitrile compound having a low molecular weight such as phthalonitrile, isophthalonitrile, and terephthalonitrile can also be used. Examples of such a usable nitrile compound having a low molecular weight include compounds obtained by substituting hydrogen groups of these compounds with hydroxyl groups, amino groups, sulfo groups, carboxyl groups, halogen groups, $NO_2$ groups, and $SH_2$ groups, and phenyl groups. Desirably, such a compound has a number average molecular weight of 1000 or less.

Desirably, the anionic material has a zeta potential of −20 mV or less. When zeta potential exceeds −20 mV, strength for bonding to the cationic material layer decreases and formation of a uniform anionic material layer is difficult.

Also preferably, the cationic material and the anionic material have functional groups capable of being combined with each other. In this case, the cationic material layer and the anionic material layer firmly bond to each other, so the cationic material and the anionic material can be more prevented from eluting into an electrolytic solution. Moreover, in this case, a dense coating layer can be formed, and the dense coating layer can suppress the electrolytic solution from being decomposed. The phrase "capable of being combined with each other" means that the functional groups can form a complex with each other, or react to each other. For example, when polyethylene imine is selected as a cationic material and an organic material containing a carboxyl group is selected as an anionic material, the carboxyl group and an imino group easily react and firmly bond to each other.

Preferably, at least one of the cationic material layer and the anionic material layer contains inorganic particles, and especially preferably, the cationic material layer contains the inorganic particles. The inorganic particles are not particularly limited, but preferably the inorganic particles have ion conductivity. For example, in a case of a lithium-ion secondary battery, at least one of the cationic material layer and the anionic material layer preferably contains a phosphate, an oxide, a sulfide, a sulfate, a carbonate, a nitrate, etc. of lithium, and especially desirably contains lithium phosphate. Inclusion of these inorganic particles may improve cycle characteristics. Even when the coating layer contains the inorganic particles at concentrations of, for example, 0.2 mass % or 50.0 mass %, the inorganic particles exhibit almost the same level of effects.

Although the cationic material layer and the anionic material layer can be formed by CVD, PVD, or the like, these methods are not preferred in view of costs. Desirably the cationic material layer and the anionic material layer are formed by dissolving a cationic material and an anionic material in separate solvents, and coating the solutions. Coating can be made by using sprayers, rollers, brushes, or the like, but coating by dipping is preferred in order to form a uniform coating layer on surfaces of the positive electrode active material particles.

If coating is performed by dipping, gaps between the positive electrode active material particles are filled with a solution, a cationic material layer or an anionic material layer can be formed on almost entire surfaces of the positive electrode active material particles. A resulting coating layer securely prevents direct contact of the positive electrode active material particles and the electrolytic solution.

A coating method by dipping has two choices. First, a slurry containing at least positive electrode active material particles and a binder is applied to a current collector, thereby forming a positive electrode. Then the positive electrode is immersed in a solution in which a material having a zeta potential of opposite sign to that of the positive electrode active material particles is dissolved. For example, when the positive electrode active material particles have a negative zeta potential, the positive electrode is immersed in a solution of a cationic material, removed and dried. Next, the positive electrode is immersed in a solution of an anionic material, removed and dried. The above operation is repeated, if necessary, and thus a coating layer having a predetermined thickness is formed.

The other method is as follows. First, powder of positive electrode active material particles is mixed in a solution of a material having a zeta potential of opposite sign to that of the positive electrode active material particles, and the mixture is dried by freeze drying or the like. For example, when positive electrode active material particles have a negative zeta potential, powder of the positive electrode active material particles is mixed in a solution of a cationic material, and the mixture is dried by freeze drying or the like. Next, the dried material is mixed in a solution of an anionic material and dried. The above operation is repeated, if necessary, and thus a coating layer of a predetermined thickness is formed. After then, a positive electrode is formed by using the positive electrode active material particles having the coating layer.

Preferably the coating layer has a thickness in a range of 1 to 1000 nm, and especially desirably in a range of 1 to 100 nm. If the coating layer has an excessively small thickness, the positive electrode active material particles may directly contact an electrolytic solution. If the coating layer has a thickness on a micrometer order or above, the coating layer when used in a secondary battery exhibits resistance and decreases ion conductivity. Such a thin coating layer can be formed by preparing dilute dipping solutions of the cationic material or the anionic material, and repeating coating the positive electrode active material particles with the dilute solutions alternately. Thus, a thin uniform coating layer can be formed.

The coating layer only needs to cover at least part of surfaces of the positive electrode active material particles, but in order to prevent direct contact with the electrolytic solution, preferably the coating layer covers almost all surfaces of the positive electrode active material particles.

An organic solvent can be used as a solvent for the cationic material or the anionic material. This organic solvent is not particularly limited and can be a mixture of a plurality of kinds of solvents. Examples of the organic solvent include alcohols such as methanol, ethanol and propanol; ketones such as acetone, methyl ethyl ketone and methyl isobutyl ketone; esters such as ethyl acetate and butyl acetate; aromatic hydrocarbons such as benzene and toluene; DMF; N-methyl-2-pyrrolidone; and mixed solvents of N-methyl-2-pyrrolidone and an ester-based solvent (e.g., ethyl acetate, n-butyl acetate, butyl cellosolve acetate, and butyl carbitol acetate) or a glyme-based solvent (e.g., diglyme, triglyme, and tetraglyme).

When a material of a material layer first formed on surfaces of the positive electrode active material particles is soluble in water, use of water as a solvent is preferred. Cycle characteristics of a second battery is improved by employing a positive electrode produced by forming at least a material layer which contacts surfaces of the positive electrode active material particles from an aqueous solution. The reason for this is not clear yet, but followings are listed as possible causes. First, impurities covering surfaces of the positive electrode active material particles dissolve in water. Second, zeta potential of the material becomes great, so Coulomb's force between the material and the positive electrode active material is increased.

Preferably each of the dipping solutions of the cationic material and the anionic material has a concentration of not less than 0.001 mass % and less than 1.0 mass %, and desirably in a range from 0.1 mass % to 0.5 mass %. If the concentration is too low, probability of contact with the positive electrode active material particles is low and coating may take a long time. If the concentration is too high, a resulting coating layer may hinder an electrochemical reaction on the positive electrode.

The bonding portion contained in the positive electrode active material layer is a portion formed by drying a binder and bonds the positive electrode active material particles with each other and bonds the positive electrode active material particles with the current collector. Preferably the coating layer is formed on at least part of the bonding portion. This enhances bonding strength and a resulting positive electrode active material layer is prevented from cracking or peeling off even after a severe cycle test.

Examples of the binder include polyvinylidene difluoride (PVDF), polytetrafluoroethylene (PTFE), styrene-butadiene rubber (SBR), polyimide (PI), polyamide imide (PAI), carboxymethyl cellulose (CMC), polyvinyl chloride (PVC), methacrylic resin (PMA), polyacrylonitrile (PAN), modified polyphenylene oxide (PPO), polyethylene oxide (PEO), polyethylene (PE), and polypropylene (PP). The positive electrode active material layer may include, singly or in combination, one or more curing agents such as epoxy resin, melamine resin, blocked polyisocyanate, polyoxazoline, and polycarbodiimide, and/or one or more additives such as ethylene glycol, glycerin, polyether polyol, polyester polyol, acryl oligomer, phthalate esters, dimer acid-modified compounds, and polybutadiene-based compounds, as long as these do not impair characteristics of the positive electrode binder.

Also preferably, the positive electrode active material layer contains a conductive additive. The conductive additive is added in order to increase electric conductivity of the electrode. As the conductive additive, carbon black, graphite, acetylene black (AB) and Ketjenblack (trademark) (KB) vapor grown carbon fiber (VGCF) and the like as fine carbonaceous particles can be added singly or in combinations of two or more. The amount of the conductive additive is not particularly limited and, for example, can be about 20 to 100 parts by mass with respect to 100 parts by mass of an active material. If the amount of the conductive additive is less than 20 parts by mass, an efficient conductive path cannot be formed. If the amount of the conductive additive exceeds 100 parts by mass, electrode shape formability deteriorates and energy density decreases.

A nonaqueous secondary battery according to the present invention comprises the positive electrode of the present invention. The nonaqueous secondary battery of the present invention can employ a known negative electrode and a known electrolytic solution. The negative electrode includes a current collector and a negative electrode active material layer bonded to the current collector. The negative electrode active material layer contains at least a negative electrode active material and a binder, and can contain a conductive additive. EMPLOYABLE as a negative electrode active material is a known material such as graphite, hard carbon, silicon, carbon fiber, tin (Sn) and silicon oxide. Silicon oxide expressed by $SiO_x$ ($0.3 \leq x \leq 1.6$) can also be used. Each particle of this silicon oxide powder is $SiO_x$, which comprises fine Si, and $SiO_2$ covering Si decomposed by disproportionation reaction. If x is smaller than the lower limit value, the ratio of Si becomes high, so a volume change in charge or discharge becomes too great that cycle characteristics deteriorate. On the other hand, when x exceeds the upper limit, the ratio of Si becomes low, so energy density lowers. The range of x is preferably $0.5 \leq x \leq 1.5$, and more desirably $0.7 \leq x \leq 1.2$.

Almost all SiO is said to be undergo disproportionation to separate into two phases at 800 deg. C. or more in an oxygen-free atmosphere. Specifically, powder of silicon oxide including two phases of amorphous $SiO_2$ phase and crystal Si phase can be obtained by applying heat treatment to raw material silicon oxide powder containing amorphous SiO powder at 800 to 1,200 deg. C. for 1 to 5 hours in an inert atmosphere such as in vacuum and in an inert gas.

Moreover, a composite of a carbon material and $SiO_x$ at a mass ratio of 1 to 50:100 can be used in place of the silicon oxide. Cycle characteristics can be improved by compounding the carbon material. When the ratio of the carbon material to $SiO_x$ is less than 1 mass %, an effect of improving electric conductivity cannot be obtained. When the ratio of the carbon material to $SiO_x$ exceeds 50 mass %, the ratio of $SiO_x$ relatively decreases, so negative electrode capacity decreases. Preferably, the ratio of the carbon material to $SiO_x$ falls in a range from 5 to 30 mass % and more desirably in a range from 5 to 20 mass %. The carbon material can be compounded with $SiO_x$ by CVD or the like.

Desirably, the silicon oxide powder has an average particle size in a range from 1 to 10 μm. When the average particle size is larger than 10 μm, charge and discharge characteristics of a resulting nonaqueous secondary battery deteriorate. When the average particle size is smaller than 1 μm, the particles aggregate to form coarse particles, and as a result, charge and discharge characteristics of a resulting nonaqueous secondary battery may similarly deteriorate.

The current collector, the binder and the conductive additive of the negative electrode can be similar ones to those used in the positive electrode active material layer.

The nonaqueous secondary battery of the present invention employing the positive electrode and the negative electrode mentioned above can employ a known electrolytic solution and a known separator which are not particularly limited. When the nonaqueous secondary battery is a lithium-ion secondary battery, the electrolytic solution is a solution in which lithium salt as an electrolyte is dissolved in an organic solvent. The electrolytic solution is not particularly limited. The organic solvent can be an aprotic organic solvent such as at least one selected from propylene carbonate (PC), ethylene carbonate (EC), dimethyl carbonate (DMC), diethyl carbonate (DEC), ethyl methyl carbonate (EMC), and the like. The electrolyte to be dissolved can be lithium salt which is soluble in an organic solvent, such as $LiPF_6$, $LiBF_4$, $LiAsF_6$, $LiI$, $LiClO_4$, and $LiCF_3SO_3$.

For example, the electrolytic solution can be a solution in which lithium salt such as $LiClO_4$, $LiPF_6$, $LiBF_4$ and $LiCF_3SO_3$ is dissolved at a concentration of about 0.5 to 1.7 mol/l in an organic solvent such as ethylene carbonate, dimethyl carbonate, propylene carbonate, and diethyl carbonate.

The separator serves to separate the positive electrode and the negative electrode and hold the electrolytic solution, and can be a thin microporous film of polyethylene, polypropylene or the like.

Shape of the nonaqueous secondary battery of the present invention is not particularly limited and can be selected from a variety of shapes including a cylindrical shape, a multi-layered shape, and a coin shape. Even when the nonaqueous secondary battery of the present invention takes any shape, an electrode assembly is formed by sandwiching the separator with the positive electrode and the negative electrode. Then, intervals from the positive-electrode current-collector and negative-electrode current-collector up to the positive-electrode terminals and negative-electrode terminals, which lead to the outside, are respectively connected with current collecting leads or the like. Subsequently, this electrode assembly is sealed in a battery casing together with the electrolytic solution, thereby forming a battery.

Hereinafter, the present invention will be described in detail by way of examples.

First Example

In the present example, $LiNi_{1/3}Co_{1/3}Mn_{1/3}O_2$ powder as positive electrode active material particles, polyethylene imine (PEI) as a cationic material, and polyethylene glycol (PEG) having a number average molecular weight (Mn) of 200 as an anionic material.
<Zeta Potential Measurement>

Powder of the positive electrode active material particles was dispersed in acetone at a concentration of 0.1 mass %, and zeta potential was measured. Measurement of zeta potential was performed by laser Doppler electrophoresis by using a quartz cell at a temperature of 25 deg. C. As a result, the positive electrode active material particles had a zeta potential of −75.7 mV. Next, polyethylene imine (PEI) having a number average molecular weight of 1,800 was dissolved at a concentration of 0.1 mass % in a dispersion fluid of the above positive electrode active material particles in acetone, and the mixture was stirred for one hour at 25 deg. C. Then the mixture was filtered, washed with ethanol and air dried, thereby obtaining positive electrode active material powder having a cationic material layer. The obtained positive electrode active material was again dispersed in acetone at a concentration of 0.1 mass %, and zeta potential was measured in a similar way to the above. The measured zeta potential was 59.8 mV.

Polyethylene glycol (PEG) having an average number molecular weight of 20,000 was dissolved in this acetone dispersion at a concentration of 0.1 mass %, and the mixture was stirred for one hour at 25 deg. C. Then the mixture was filtered, washed with ethanol and air dried, thereby obtaining positive electrode active material powder having an anionic material layer on a surface of the cationic material layer. This powder was again dispersed in acetone at a concentration of 0.1 mass %, and zeta potential was measured in a similar manner to the above. The measured zeta potential was −84.0 mV.

That is to say, the abovementioned positive electrode active material particles were originally negatively charged but acquired a positive charge by having the cationic material layer, and then acquired a negative charge again by further having the anionic material layer. This suggests that the cationic material and the anionic material were deposited in this order on the positive electrode active material particles.
<Formation of Positive Electrode>

A slurry was prepared by mixing 88 parts by mass of $LiNi_{1/3}Co_{1/3}Mn_{1/3}O_2$ as positive electrode active material powder, 6 parts by mass of acetylene black (AB) as a conductive additive, and 6 parts by mass of polyvinylidene fluoride (PVdF) as a binder. The mixed slurry was coated on a surface of aluminum foil (a current collector) by using a doctor blade and then dried, thereby forming a positive electrode active material layer having a thickness of about 15 μm.

The positive electrode obtained above was immersed at 25 deg. C. for one hour in a solution in which polyethylene imine (PEI) having a number average molecular weight (Mn) of 1,800 was dissolved in ethanol at a concentration of 0.1 mass % and then removed and air dried. Then the dried positive electrode was immersed at 25 deg. C. for one hour in a solution in which polyethylene glycol (PEG) having a number average molecular weight (Mn) of 200 was dissolved in DMF at a concentration of 1 mass %, and then removed and air dried.

Since gaps between the positive electrode active material particles were sufficiently filled with the polymer solutions by the one-hour immersions, a cationic material layer and an anionic material layer coated almost all surfaces of the positive electrode active material particles. Owing to the immersions at 25 deg. C., elution of the cationic material layer or the binder was not observed. The coating layer comprising polyethylene imine (PEI) and polyethylene glycol (PEG) had a thickness of about 5 nm.
<Formation of Negative Electrode>

A slurry was prepared by mixing 97 parts by mass of graphite, 1 part by mass of Ketjenblack (trademark) (KB) powder, 2 parts by mass of a binder comprising a mixture of styrene-butadiene rubber (SBR) and carboxymethyl cellulose (CMC). This slurry was applied on a surface of electrolytic copper foil (a current collector) having a thickness of 18 μm by using a doctor blade, thereby forming a negative electrode active material layer having a thickness of about 15 μm on the copper foil.
<Production of Lithium-Ion Secondary Battery>

A nonaqueous electrolytic solution was prepared by dissolving $LiPF_6$ at a concentration of 1M in a solvent comprising a mixture of ethylene carbonate (EC) and diethyl carbonate (DEC) at a volume ratio of 3:7.

Next, an electrode assembly was produced by sandwiching a porous polypropylene/polyethylene/polypropylene laminate film having a thickness of 20 μm as a separator with the abovementioned positive electrode and the abovementioned negative electrode. Then this electrode assembly was wrapped with a polypropylene laminate film and its periphery was heat sealed, thereby forming a film-packed battery. Before a last side was heat sealed, the abovementioned nonaqueous electrolytic solution was introduced into the film casing so as to impregnate the electrode assembly.
<Test>

First, the lithium-ion secondary battery obtained above was charged at 1 C up to 4.5 V at a temperature of 25 deg. C. and then discharged at three constant current (CC) rates of 0.33 C, 1 C and 5 C down to 3.0 V and discharge capacity at each rate was measured. Next, the lithium-ion secondary battery was subjected to a cycle test in which one cycle consisted of a 1 C constant current-constant voltage (CCCV) charge up to 4.5 V at a temperature of 55 deg. C., rest for 10 minutes, a 1 C constant current (CC) discharge down to 3.0 V and rest for 10 minutes and was repeated 25 times.

After the cycle test, the lithium-ion secondary battery was again charged at 1 C up to 4.5 V at a temperature of 25 deg. C. and discharged at three CC rates of 0.33 C, 1 C, 5 C down to 3.0V and discharge capacity at each rate was measured.

A capacity retention rate, which is a ratio of discharge capacity after the cycle test to discharge capacity before the cycle test, at 25 deg. C. at each discharge rate was calculated. The result is shown in Table 1.

Second Example

A positive electrode was formed by forming a coating layer on a positive electrode active material layer in the same way as in the First Example, except for using polyethylene glycol (PEG) having a number average molecular weight (Mn) of 2,000. The coating layer comprising polyethylene imine (PEI) and polyethylene glycol (PEG) had a thickness of about 5 nm.

A lithium-ion secondary battery was produced in the same way as in the First Example, except for using this positive electrode. A capacity retention rate at each discharge rate was calculated in the same way as in the First Example. The result is shown in Table 1.

Third Example

A positive electrode was formed by forming a coating layer on a positive electrode active material layer in the same way as in the First Example, except for using polyethylene glycol (PEG) having a number average molecular weight (Mn) of 20,000. The coating layer comprising polyethylene imine (PEI) and polyethylene glycol (PEG) had a thickness of about 5 nm.

A lithium-ion secondary battery was produced in the same way as in the First Example, except for using this positive electrode. A capacity retention rate at each discharge rate was calculated in the same way as in the First Example. The result is shown in Table 1.

Fourth Example

A positive electrode was formed by forming a coating layer on a positive electrode active material layer in the same way as in the First Example, except for using polyethylene glycol (PEG) having a number average molecular weight (Mn) of 2,000. The coating layer comprising polyethylene imine (PEI) and polyethylene glycol (PEG) had a thickness of about 5 nm. This positive electrode was heat treated at 120 deg. C. for one hour in a vacuum atmosphere.

A lithium-ion secondary battery was produced in the same way as in the First Example, except for using this heat-treated positive electrode. A capacity retention rate at each discharge rate was calculated in the same way as in the First Example. The result is shown in Table 1.

First Comparative Example

A lithium-ion secondary battery was produced in the same way as in the First Example, except for using a positive electrode that was similar to that of the First Example but had no coating layer. A capacity retention rate at each discharge rate was calculated in the same way as in the First Example. The result is shown in Table 1.

<Evaluation>

TABLE 1

| | CATIONIC MATERIAL | ANIONIC MATERIAL | HEAT TREATMENT | RATE (C) | CAPACITY RETENTION RATE (%) |
|---|---|---|---|---|---|
| EX. 1 | PEI | PEG (Mn = 200) | — | 0.33 | 42.7 |
| | | | | 1 | 25.0 |
| | | | | 5 | 0.0 |
| EX. 2 | PEI | PEG (Mn = 2000) | — | 0.33 | 42.7 |
| | | | | 1 | 26.1 |
| | | | | 5 | 0.0 |
| EX. 3 | PEI | PEG (Mn = 20000) | — | 0.33 | 55.4 |
| | | | | 1 | 41.9 |
| | | | | 5 | 0.7 |
| EX. 4 | PEI | PEG (Mn = 2000) | 120 deg. C. × 1 hr | 0.33 | 54.0 |
| | | | | 1 | 39.0 |
| | | | | 5 | 0.2 |
| COMP. EX. 1 | NO COATING | | — | 0.33 | 41.0 |
| | | | | 1 | 26.6 |
| | | | | 5 | 0.1 |

As is apparent from Table 1, the lithium-ion secondary batteries of the examples had higher capacity retention rates at the 0.33 C rate than that of the First Comparative Example, in spite of being charged at a high voltage of 4.5 V. As is also apparent from Table 1, the lithium-ion secondary battery of the Third Example had higher capacity retention rates not only at the 0.33 C rate but also at the 1 C and 5 C rates than that of the First Comparative Example. Clearly, these advantageous effects were brought by formation of the coating layers.

Moreover, a comparison of the Fourth Example and the Second Example shows that in spite of employing polyethylene glycol (PEG) having the same molecular weight, the lithium-ion secondary battery of the Fourth Example exhibited higher capacity retention rates than that of the Second Example. Clearly, applying heat treatment after forming a coating layer on a positive electrode active material layer is preferred.

Fifth Example

A positive electrode active material layer having a thickness of about 15 μm was formed by preparing a mixed slurry containing 88 parts by mass of $LiNi_{1/3}Co_{1/3}Mn_{1/3}O_2$ as positive electrode active material powder, 6 parts by mass of acetylene black (AB) as a conductive additive, and 6 parts by mass of polyvinylidene fluoride (PVdF) as a binder, applying the mixed slurry on a surface of aluminum foil (a current collector) by using a doctor blade, and then drying the coated slurry.

The positive electrode produced above was immersed at 25 deg. C. for one hour in a solution in which polyethylene imine (PEI) having a number average molecular weight (Mn) of 1,800 was dissolved in ethanol at a concentration of 0.1 mass %, and then removed and air dried. Subsequently, the positive electrode was immersed at a temperature of 25 deg. C. for one hour in a solution in which polyacrylonitrile (PAN) (Mw=150,000, produced by Polysciences, Inc.) was dissolved in DMF at a concentration of 0.1 mass and then removed and air dried. The coating layer comprising polyethylene imine (PEI) and polyacrylonitrile (PAN) had a thickness of about 10 nm.

A lithium-ion secondary battery was produced in the same way as in the First Example, except for using this positive electrode. The lithium-ion secondary battery was subjected to a cycle test in which one cycle consisted of a 0.2 C constant current-constant voltage (CCCV) charge up to 4.5 V at a temperature of 25 deg. C., rest for 10 minutes, a constant current (CC) discharge down to 3.0 V and rest for 10 minutes and was repeated 25 times. Discharge capacity at a CC discharge rate of 1 C was measured. A capacity retention rate, which is a ratio of discharge capacity after the cycle test to that before the cycle test, was calculated. The result is shown in Table 2 together with capacity before the cycle test.

Sixth Example

A positive electrode was formed by forming a coating layer on a positive electrode active material layer in the same way as in the Fifth Example, except for using a solution in which polyacrylonitrile (PAN) was dissolved in DMF at a concentration of 0.5 mass %.

A lithium-ion secondary battery was produced in the same way as in the First Example, except for using this positive electrode. A capacity retention rate was calculated in the same way as in the Fifth Example. The result is shown in Table 2 together with capacity before the cycle test.
<Evaluation>

TABLE 2

| CATIONIC MATERIAL | ANIONIC MATERIAL | CAPACITY (mAh/g) | CAPACITY RETENTION RATE (%) |
|---|---|---|---|
| EX. 4 | PEI | PEG (Mn = 2000) | 153.2 | 39.0 |
| EX. 5 | PEI | PAN (0.1 wt %) | 168.0 | 45.2 |
| EX. 6 | PEI | PAN (0.5 wt %) | 167.6 | 47.1 |
| COMP. EX. 1 | NO COATING | | 169.4 | 26.6 |

Table 2 also shows capacity before the cycle test and capacity retention rates at the 1 C rate, taken out from the test results of the lithium-ion secondary batteries of the Fourth Example and the First Comparative Example.

As is apparent from Table 2, the lithium-ion secondary batteries of the examples had higher capacity retention rates at the 1 C rate than that of the First Comparative Example, in spite of being charged at a high voltage of 4.5 V. As is also clear from Table 2, use of polyacrylonitrile (PAN) instead of polyethylene glycol as an anionic material suppresses a decrease in initial capacity and increases capacity retention rates. Table 2 also indicates that concentration of polyacrylonitrile (PAN) in the solutions has little effect on battery characteristics as long as it falls in this range.

Seventh Example

A positive electrode active material layer having a thickness of about 15 μm was formed by preparing a mixed slurry containing 88 parts by mass of $LiNi_{1/3}Co_{1/3}Mn_{1/3}O_2$ as positive electrode active material powder, 6 parts by mass of acetylene black (AB) as a conductive additive, and 6 parts by mass of polyvinylidene fluoride (PVdF) as a binder, applying the mixed slurry on a surface of aluminum foil (a current collector) by using a doctor blade, and then drying the coated slurry.

The positive electrode produced above was immersed at 25 deg. C. for one hour in a solution in which polyethylene imine (PEI) having a number average molecular weight (Mn) of 1,800 was dissolved in ethanol at a concentration of 0.1 mass %, and then removed and air dried. Subsequently, the positive electrode was immersed at a temperature of 25 deg. C. for one hour in a solution in which pimelonitrile was dissolved in DMF at a concentration of 0.1 mass %, and then removed and air dried. The coating layer comprising polyethylene imine (PEI) and pimelonitrile had a thickness of about 3 nm.

A lithium-ion secondary battery was produced in the same way as in the First Example, except for using this positive electrode. A capacity retention rate was calculated in the same way as in the Fifth Example. The result is shown in Table 3.

Second Comparative Example

A positive electrode active material layer having a thickness of about 15 μm was formed by preparing a mixed slurry containing 88 parts by mass of $LiNi_{1/3}Co_{1/3}Mn_{1/3}O_2$ as positive electrode active material powder, 6 parts by mass of acetylene black (AB) as a conductive additive, and 6 parts by mass of polyvinylidene fluoride (PVdF) as a binder, applying the mixed slurry on a surface of aluminum foil (a current collector) by using a doctor blade, and then drying the coated slurry.

The positive electrode produced above was immersed at 25 deg. C. for one hour in a solution in which pimelonitrile was dissolved in DMF at a concentration of 0.1 mass %, and then removed and air dried. The coating layer comprising pimelonitrile had a thickness of about 3 nm.

A lithium-ion secondary battery was produced in the same way as in the First Example, except for using this positive electrode. A capacity retention rate was calculated in the same way as in the Fifth Example. The result is shown in Table 3. Table. 3 also shows the test results of the lithium-ion secondary batteries of the Fifth Example and the First Comparative Example.
<Evaluation>

TABLE 3

| | CATIONIC MATERIAL | ANIONIC MATERIAL | CAPACITY RETENTION RATE (%) |
|---|---|---|---|
| EX. 5 | PEI | PAN (0.1 wt. %) | 45.2 |
| EX. 7 | PEI | PIMELONITRILE | 53.1 |
| COMP. EX. 1 | NO COATING | | 26.6 |
| COMP. EX. 2 | | PIMELONITRILE | 41.0 |

As is apparent from the result of the Second Comparative Example, capacity retention rate is improved when compared with that of the First Comparative Example by providing a coating of pimelonitrile alone, but drastically improved by using a positive electrode coated with polyethylene imine and pimelonitrile in this order. Moreover, as is clearly understood from a comparison of the Fifth Example and the Seventh Example, use of pimelonitrile as an anionic material is preferred to use of polyacrylonitrile.

Eighth Example

Positive electrode active material layers having thicknesses of about 15 μm were formed by preparing a mixed slurry containing 88 parts by mass of $LiNi_{1/3}Co_{1/3}Mn_{1/3}O_2$ as positive electrode active material powder, 6 parts by mass of acetylene black (AB) as a conductive additive, and 6 parts by mass of polyvinylidene fluoride as a binder, applying the mixed slurry on surfaces of aluminum foil (electric collectors) by using a doctor blade, and then drying the coated slurry.

Cationic solutions were prepared by dispersing lithium phosphate ($Li_3(PO)_4$) in a solution in which polyethylene imine having a number average molecular weight (Mn) of 1,800 was dissolved in ethanol at a concentration of 1 mass %. The positive electrodes produced above were respectively immersed in these cationic solutions at 25 deg. C. for one hour, and then removed and air dried. Subsequently, the positive electrodes were immersed at a temperature of 25 deg. C. for one hour in a solution in which polyacrylonitrile was dissolved in DMF at a concentration of 0.1 mass %, and then removed and air dried. The cationic solutions had three different lithium phosphate concentrations of 0.20 mass %, 1.00 mass % and 5.00 mass %. Each coating layer had a thickness of about 6 nm.

Lithium-ion secondary batteries were respectively produced in the same way as in the First Example, except for using these positive electrodes. Capacity retention rates were calculated in the same way as in the Fifth Example. The results are shown in Table 4. Table 4 also shows the test result of the lithium-ion secondary battery of the Fifth Example.

<Evaluation>

TABLE 4

| | CATIONIC MATERIAL | ANIONIC MATERIAL | CAPACITY RETENTION RATE (%) |
|---|---|---|---|
| EX. 5 | PEI | PAN (0.1 wt. %) | 45.2 |
| | | PAN (0.1 wt. %) + $Li_3(PO)_4$ (0.20 wt. %) | 53.1 |
| EX. 8 | PEI | PAN (0.1 wt. %) + $Li_3(PO)_4$ (1.00 wt. %) | 52.8 |
| | | PAN (0.1 wt. %) + $Li_3(PO)_4$ (5.00 wt. %) | 59.1 |

As is apparent from Table 4, capacity retention rate is improved by using lithium phosphate together with polyethylene imine as an anionic material rather than using polyethylene imine alone. As is also clear from Table 4, concentration of lithium phosphate in the anionic material has little effect on battery characteristics as long as it falls in the range used in this experiment.

Ninth Example

A positive electrode active material layer having a thickness of about 15 μm was formed by preparing a mixed slurry containing 88 parts by mass of $LiNi_{1/3}Co_{1/3}Mn_{1/3}O_2$ as positive electrode active material powder, 6 parts by mass of acetylene black (AB) as a conductive additive, and 6 parts by mass of polyvinylidene fluoride as a binder, applying the mixed slurry on a surface of aluminum foil (a current collector) by using a doctor blade, and then drying the coated slurry.

The positive electrode produced above was immersed at 25 deg. C. for 15 minutes in an aqueous solution in which polyethylene imine having a number average molecular weight (Mn) of 1,800 was dissolved in distilled water at a concentration of 1 mass %, and then removed and air dried. Subsequently, the positive electrode was immersed at a temperature of 25 deg. C. for 30 minutes in a solution in which polyacrylonitrile was dissolved in DMF at a concentration of 0.1 mass %, and then removed and air dried. The coating layer had a thickness of about 8 nm.

A lithium-ion secondary battery was produced in the same way as in the First Example, except for using this positive electrode. A capacity retention rate was calculated in the same way as in the Fifth Example. The result is shown in Table 5. Moreover, a relation between cycle numbers and capacity retention rates is shown in FIG. 1. Table 5 also shows the test results of the lithium-ion secondary batteries of the Fifth Example and the First Comparative Example.

<Evaluation>

TABLE 5

| | CATIONIC MATERIAL | ANIONIC MATERIAL | CAPACITY RETENTION RATE (%) |
|---|---|---|---|
| EX. 5 | PEI in ETHANOL | PAN (0.1 wt. %) | 45.2 |
| EX. 9 | PEI in DISTILLED WATER | PAN (0.1 wt. %) | 81.2 |
| COMP. EX. 1 | NO COATING | | 26.6 |

As is apparent from FIG. 1 and Table 5, capacity retention rate is remarkably improved by using water as a solvent instead of using ethanol when polyethylene imine is used as a cationic material. Although the reason for this is not clear yet, followings are listed as possible causes. First, use of water having a high permittivity increases an absolute value of zeta potential and accordingly increases Coulomb's force between polyethylene imine and the positive electrode active material. Second, water dissolves $Li_2CO_3$ on the positive electrode active material and causes a real surface of the positive electrode active material to be exposed and covered with polyethylene imine. Third, a lithium ion (Li+) forms a Coordinate bond with an amine group of polyethylene imine, and this increases cationic property.

Tenth Example

Aluminum foil was used as a positive electrode current collector and coated with indium tin oxide (ITO) by sputtering. The coating film had a thickness of 100 nm. Subsequently, a positive electrode active material layer was formed by applying a slurry in the same way as in the First Example. The positive electrode thus produced was immersed in an ethanol solution containing 0.1 wt. % of polyethylene imine (PEI) at 25 deg. C. for 15 minutes. Then the positive electrode was removed from the solution and air dried. Next, the positive electrode was immersed at 25 deg. C. for 30 minutes in such a solution of polyacrylonitrile (PAN) in DMF as was used in the Fifth Example, and similarly removed and air dried.

A lithium-ion secondary battery was produced in the same way as in the First Example, except for using this positive electrode. Capacity retention rates at 0.33 C and 1 C were calculated in the same way as in the First Example. The results are shown in Table 6.

TABLE 6

| | CATIONIC MATERIAL | ANIONIC MATERIAL | RATE (C) | CAPACITY RETENTION RATE (%) |
|---|---|---|---|---|
| EX. 10 | PEI | PAN | 0.33 | 69.4 |
| | | | 1 | 51.3 |

Eleventh Example

Each positive electrode active material layer having a thickness of about 15 μm was formed by preparing a mixed slurry containing 94 parts by mass of $LiNi_{0.5}Co_{0.2}Mn_{0.3}O_2$ as positive electrode active material powder, 3 parts by mass of acetylene black (AB) as a conductive additive, and 3 parts by mass of polyvinylidene fluoride (PVdF) as a binder, applying the mixed slurry on a surface of aluminum foil (a current collector) by using a doctor blade, and then drying the coated slurry.

The positive electrodes produced above were immersed at 25 deg. C. for 10 minutes in a solution in which polyethylene imine (PEI) having a number average molecular weight (Mn) of 1,800 was dissolved in ethanol at a concentration of 0.1 mass %, and then removed and air dried. Subsequently, the positive electrodes were immersed at a temperature of 25 deg. C. for 10 minutes in a solution in which polyacrylic acid was dissolved in ethanol at a concentration of 0.2 mass %, and then removed and air dried. This series of operations was repeated once, twice, three times or four times, thereby producing positive electrodes of the Eleventh Example, the Twelfth Example, the Thirteenth Example and the Fourteenth Example.

Third Comparative Example

A positive electrode of the Third Comparative Example was produced in the same way as in the Eleventh Example, the Twelfth Example, the Thirteenth Example and the Fourteenth Example, except for forming no coating layer.

<Test>

Lithium-ion secondary batteries were produced in the same way as in the First Example, except for using these positive electrodes. These lithium-ion secondary batteries were examined for initial capacity, i.e., discharge capacity when first charged in a 0.2 C constant current-constant voltage (CCCV) mode up to 4.5 V at a temperature of 25 deg. C., rested for 10 minutes, and then discharged at a 0.33 C constant current (CC) mode down to 3.0 V.

Next, the lithium-ion secondary batteries were subjected to a cycle test in which one cycle consisted of a 1 C constant current-constant voltage (CCCV) charge up to 4.5 V, rest for 10 minutes, a constant current (CC) discharge down to 3.0 V and rest for 10 minutes, and was repeated 200 times. The CC discharge rate was 1 C. The lithium-ion secondary batteries after the cycle test were examined for discharge capacity at 0.33 C in the same way as in the above measurement of the initial capacity. Then, capacity retention rates, which are ratios of discharge capacities after the cycle test to discharge capacities before the cycle test, were calculated. The results are shown in Table 7 together with the initial capacities before the cycle test.

TABLE 7

|  | EX. 11 | EX. 12 | EX. 13 | EX. 14 | COMP. EX. 3 |
|---|---|---|---|---|---|
| INITIAL CAPACITY at 0.33 C (mAh/g) | 144.3 | 143.8 | 143.0 | 141.4 | 143.3 |
| CAPACITY RETENTION RATE at 0.33 C (%) | 81.4 | 81.2 | 80.0 | 80.2 | 79.0 |

<Evaluation>

The lithium-ion secondary batteries of the Eleventh Example, the Twelfth Example, the Thirteenth Example and the Fourteenth Example had higher capacity retention rates than that of the Third Comparative Example and their discharge capacities did not decrease even after the cycle test at a high voltage. As seen from high scores of the Eleventh Example and the Twelfth Example, coating a positive electrode with each of polyethylene imine and polyacrylic acid once or twice is preferred.

Figure 2:
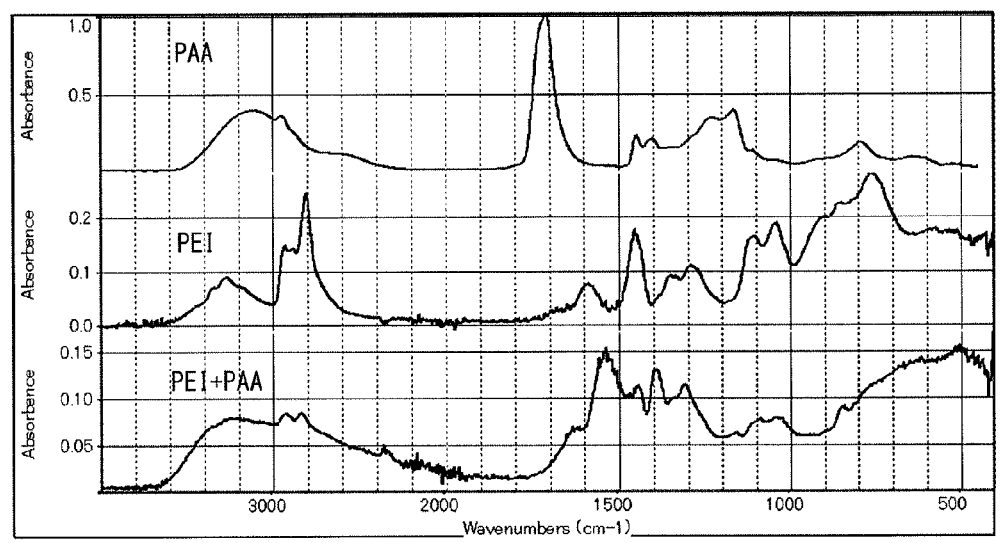
FIG. 2 shows FI-IR spectra of a polyacrylic acid film, a polyethylene imine film, and a polyacrylic acid-polyethylene imine laminate film.

Moreover, three kinds of films were formed on aluminum foil by using the polyethylene imine solution and the polyacrylic acid solution prepared in the Eleventh Example, the Twelfth Example, the Thirteenth Example and the Fourteenth Example. The three kinds of films were a polyethylene imine (PEI) film, a polyacrylic acid (21W film, a laminate film comprising a polyethylene imine lower film and a polyacrylic acid upper film (PEI+PAA). FT-IR spectra of these films are shown in FIG. 2. The spectrum of the laminate film (PEI+PAA) shows peculiar peaks at 1638 $cm^{-1}$ and 1540 $cm^{-1}$, which are not seen in the spectrum of the polyethylene imine (PEI) film or that of the polyacrylic acid (PAA) film. These peaks are close to that of an amide bond. These peaks suggest that the laminate film was not a simple mixture but included a coordination complex of polyethylene imine and polyacrylic acid.

That is to say, each of the positive electrodes of Examples 11 to 14 exhibited a high capacity retention rate even after the cycle test at a high voltage, probably because the cationic material layer and the anionic material layer were firmly bonded to each other, and accordingly suppressed from eluding into the electrolytic solution, so owing to formation of the dense coating layer, the electrolytic solution is suppressed from being decomposed.

INDUSTRIAL APPLICABILITY

The positive electrode for a secondary battery according to the present invention can be used in secondary batteries, electric double layer capacitors, lithium-ion capacitors, and the like. The positive electrode is also useful as a positive electrode for nonaqueous secondary batteries to be used to drive motors of electric and hybrid vehicles, or to be used in personal computers, mobile communication equipment, home electric appliances, office equipment, industrial equipment and so on. The positive electrode is particularly suitable to drive motors of electric or hybrid vehicles, which require high capacity and high output power.

The invention claimed is:

1. A positive electrode for a secondary battery, comprising a current collector and a positive electrode active material layer bonded to the current collector, characterized in that
said positive electrode active material layer comprises positive electrode active material particles, a bonding portion for bonding the positive electrode active particles with each other and bonding the positive electrode active material particles with the current collector, and a coating layer for coating at least part of surfaces of at least the positive electrode active material particles,
said coating layer comprises alternate layers of a cationic material layer containing a cationic material having a positive zeta potential under neutral conditions and an anionic material layer containing an anionic material having a negative zeta potential under neutral conditions, and
a material layer, which is one of either the cationic material layer or the anionic material layer, having a zeta potential of opposite sign to that of said positive electrode active material particles is bonded to surfaces of said positive electrode active material particles,
wherein the anionic material layer contains polyethylene glycol having a number average molecular weight of 500 or more.

2. The positive electrode for a lithium-ion secondary battery according to claim 1, wherein a charging potential is 4.3 V or more against a lithium reference electrode.

3. The positive electrode for a secondary battery according to claim 1, wherein the coating layer has a thickness of 1 to 1000 nm.

4. The positive electrode for a secondary battery according to claim 1, wherein the cationic material layer has a zeta potential of +20 mV or more.

5. The positive electrode for a secondary battery according to claim 1, wherein the cationic material layer contains organic cations having nitrogen (N) in molecular structure.

6. The positive electrode for a secondary battery according to claim 1, wherein the cationic material layer contains polyethylene imine.

7. The positive electrode for a secondary battery according to claim 1, wherein the anionic material layer has a zeta potential of −20 mV or less.

8. The positive electrode for a secondary battery according to claim 1, wherein the polyethylene glycol has a number average molecular weight of 20,000.

9. The positive electrode for a secondary battery according to claim 1, wherein the polyethylene glycol has been thermally treated at 60 to 150° C.

10. The positive electrode for a secondary battery according to claim 1, wherein at least one of the cationic material layer and the anionic material layer contains lithium phosphate.

11. A method for producing the positive electrode for a secondary battery according to claim 1, wherein the cationic material layer and/or the anionic material layer is formed by using an aqueous solution of the cationic material and/or an aqueous solution of the anionic material.

12. A nonaqueous secondary battery, comprising the positive electrode according to claim 1.

* * * * *